(12) United States Patent
Rungenhagen et al.

(10) Patent No.: US 8,547,473 B2
(45) Date of Patent: Oct. 1, 2013

(54) METHOD AND APPARATUS FOR IMAGING A SURROUNDING AREA ON A DETECTOR DEVICE

(75) Inventors: Matthias Rungenhagen, Ueberlingen (DE); Nicolai Kuenzner, Markdorf (DE); Hans Dieter Tholl, Uhldingen-Muehlhofen (DE)

(73) Assignee: Diehl BGT Defence GmbH & Co. KG, Ueberlingen (DE)

( * ) Notice: Subject to any disclaimer, the term of this patent is extended or adjusted under 35 U.S.C. 154(b) by 342 days.

(21) Appl. No.: 13/020,332

(22) Filed: Feb. 3, 2011

(65) Prior Publication Data

US 2011/0187919 A1   Aug. 4, 2011

(30) Foreign Application Priority Data

Feb. 3, 2010   (DE) .......................... 10 2010 006 661

(51) Int. Cl.
| | |
|---|---|
| *H04N 5/225* | (2006.01) |
| *H04N 5/235* | (2006.01) |
| *G02B 13/16* | (2006.01) |
| *G03B 7/00* | (2006.01) |

(52) U.S. Cl.
USPC ........... 348/342; 348/335; 348/340; 348/344; 348/362

(58) Field of Classification Search
USPC ................. 348/207.99, 222.1, 239, 335–344, 348/362–368; 396/63–70, 213–262
See application file for complete search history.

(56) References Cited

U.S. PATENT DOCUMENTS

| | | | |
|---|---|---|---|
| 5,351,151 | A | 9/1994 | Levy |
| 5,448,382 | A | 9/1995 | Land et al. |
| 5,708,522 | A | 1/1998 | Levy |
| 5,909,232 | A | 6/1999 | Goto et al. |
| 6,020,406 | A | 2/2000 | Gugumus |
| 6,031,588 | A | 2/2000 | Dultz et al. |
| 6,652,778 | B1 | 11/2003 | Twarowski |
| 2005/0082480 | A1* | 4/2005 | Wagner et al. ............. 250/338.1 |
| 2005/0259179 | A1* | 11/2005 | Robertson et al. ............ 348/367 |
| 2007/0153119 | A1* | 7/2007 | Bilbrey ........................ 348/373 |
| 2007/0179239 | A1 | 8/2007 | Li |
| 2011/0187918 | A1* | 8/2011 | Kunzner et al. ............... 348/342 |

FOREIGN PATENT DOCUMENTS

| | | |
|---|---|---|
| DE | 822787 C | 7/1952 |
| DE | 4305807 A1 | 10/1994 |
| EP | 0803760 A2 | 10/1997 |

* cited by examiner

*Primary Examiner* — Michael Osinski
(74) *Attorney, Agent, or Firm* — Laurence A. Greenberg; Werner H. Stemer; Ralph E. Locher

(57) ABSTRACT

A surrounding area is imaged onto a detector of a detector device. An optical system produces an imaging beam path and a panel, which is arranged in the imaging beam path, shadows a subarea of the image of the surrounding area on the detector. In order to mask out an object which would dazzle the detector device, while nevertheless being able to monitor the surrounding area, the panel is illuminated in a subarea, and the transmission of the panel in the subarea is reduced by the illumination in the entire frequency range in which the detector is sensitive. The illuminated subarea of the panel shadows the selected subarea of the image.

10 Claims, 2 Drawing Sheets

METHOD AND APPARATUS FOR IMAGING A SURROUNDING AREA ON A DETECTOR DEVICE

CROSS-REFERENCE TO RELATED APPLICATION

This application claims the priority, under 35 U.S.C. §119, of German patent application DE 10 2010 006 661.3, filed Feb. 3, 2010; the prior application is herewith incorporated by reference in its entirety.

BACKGROUND OF THE INVENTION

Field of the Invention

The invention relates to a method for imaging a surrounding area on a detector device in which an optical system produces an imaging beam path, and a panel, which is arranged in the imaging beam path, shadows a subarea of the image of the surrounding area on the detector device.

Cameras for monitoring the surrounding area are normally equipped with electrooptical sensors, for example matrix detectors, on which the surrounding area is imaged. After electronic evaluation, the image, if required or desired, is displayed on a screen. If the image contains a point radiation source or one which has a small extent in comparison with the dimensions of the field of view of the electrooptical sensor but which is strong, for example the sun, then this leads to dazzling in the reproduced image, which interferes with the image quality in an area around the imaged radiation source. In the worst case, this may even damage the detector. Furthermore, when a strong radiation source is present in the field of view of the sensor, the extent of the scene dynamics that can be detected is greatly restricted.

In order to avoid such effects, the electromagnetic radiation which is incident on the detector is prevented by varying the alignment of the detector, for example by varying the alignment of the imaging optical system. Another possibility is to close a shutter, thus preventing radiation from passing through to the detector, and therefore completely protecting the detector.

SUMMARY OF THE INVENTION

It is accordingly an object of the invention to provide a method and an apparatus for imaging a surrounding area on a detector device which overcome the above-mentioned disadvantages of the heretofore-known devices and methods of this general type and by way of which the surrounding area can be monitored reliably even when a strong radiation source is present.

With the foregoing and other objects in view there is provided, in accordance with the invention, a method for imaging a surrounding area on a detector of a detector device, the method which comprises:

providing an optical system with an imaging beam path;
placing a panel in the imaging beam path;
illuminating a subarea of the panel to reduce a transmission of the panel in the subarea by the illumination in an entire frequency range in which the detector of the detector device is sensitive, and shadowing the selected subarea of the image with the illuminated subarea of the panel.

In other words, the objects relating to the method are achieved by a method of the type mentioned initially, in which, according to the invention, the panel is illuminated in a subarea, and the transmission of the panel in the subarea is reduced by the illumination in the entire frequency range in which the detector device is sensitive. The illuminated subarea of the panel shadows the selected subarea of the image. Alignment of the illumination with the subarea of the panel, which comprises only a part of the panel such that at least substantially normal transmission is maintained for the rest of the area of the panel, makes it possible to select the subarea of the image to be shadowed. The shadowing produced by the illuminated subarea of the panel on the detector device can be placed in the field of view, that is to say in the image of the surrounding area on the detector device, such that a strong radiation source is shadowed while, in contrast, the areas of the image located outside the shadowing can still be evaluated, and the corresponding parts of the surrounding area can be monitored.

The panel is illuminated in order to produce the shadowing. The radiation which is used for this purpose, referred to in the following text as the shadowing radiation, may be introduced at the side into the beam path behind an aperture stop of the optical system, expediently behind the entire optical system, and be directed at the panel. This is expediently radiation which is directed at the panel with the aid of optics, and whose frequency is outside the sensitivity range of the detector device. It is advantageously produced by a laser, in which case it is alternatively also possible to use one or more LEDs as a radiation source.

The position of the illuminated subarea on the panel, also referred to in the following text only as the area, can be determined by a control means. This control means can operate an actuator for alignment of the shadowing radiation with the selected area on the panel. The control means is prepared for this purpose by one or more appropriate control programs whose running—for example in conjunction with suitable input signals, such as sensor signals—results in such control. The corresponding control program or programs provides or provide the control means with the capability to carry out the specified procedures, thus resulting in appropriate control when the program or programs is or are being run. The control means is used to control one, a number or all of the method steps, which are described in the following text, and also in the description of the figures.

The detector device expediently has at least one detector, in particular a matrix detector which—depending on the application—can carry out processing simultaneously or exclusively in the spectral ranges ultraviolet, visible light, near infrared, short-wave infrared, medium-wave infrared and long-wave infrared. The image expediently covers an angular range of at least 10°×10° of the surrounding area from the view of the optical system, such that this section of the surrounding area can be monitored. The optical system may be imaging optics comprising refractive, diffractive or reflective elements, or any desired combination thereof.

The panel advantageously contains thermochromic material. Material such as this carries out a phase change at a specific temperature, for example a semiconductor-metal phase change, and in the process fundamentally changes its optical characteristics, in such a way that heating of the material can reduce the transparency down to zero. Suitable materials are a number of oxides of vanadium $V_xO_y$, for example $VO_2$, which carries out a semiconductor-metal change at 68° C., $V_2O_3$, whose critical temperature is at −123° C., or non-stoichiometric mixtures. The appropriate thermochromic material is advantageously applied as a coating to a panel support material, expediently with a thickness of 0.1 μm to 1 μm. It is also expedient for the thermochromic coating to be applied to a good heat carrier, in order to allow heat that has been introduced to be dissipated quickly again, as a result of which the layer is transparent again. An industrially produced diamond layer is particularly suitable, in particular with a thickness between 10 μm and 50 μm. Simpler materials, which are transparent in the infrared band, are silicon, germanium, ZnSe or ZnS.

In one advantageous embodiment of the invention, the illumination is provided by a directional beam, and the shape of the illuminated area is governed by a change in the alignment of the beam on the panel. The beam can therefore be aligned with a moving mirror and/or with a plurality of microlenses which move with respect to one another. The size of the illuminated area can easily be adjusted, and the entire area can be illuminated uniformly if the size is produced by a change in the divergence of the beam.

It is also proposed that any energy which is introduced be controlled from the radiation source, which provides illumination from the outside, as a function of the illuminated area. This allows a large shadow area to be quickly heated, and a small area to be protected against overheating.

The shadowing radiation can easily be injected into the beam path if the illumination is provided by a directional beam which is reflected on an element of the optical system before it strikes the panel. Efficient use of the shadowing radiation for heating the panel is achieved if the shadowing radiation is reflected after passing through the panel, and strikes the panel again.

The method according to the invention is advantageously developed such that dazzling in an image of the surrounding area is identified, and the image area is selected on the basis of the position—and in particular additionally on the basis of the extent—of the dazzling in the image. This can be identified by an intensity measurement of the incident radiation, in which case the intensity is classified as being dazzling if it exceeds a limit value. Alternatively or additionally, it is possible to select the image area on the basis of the type of a dazzling object, its dynamics and/or its beam strength.

If the position of a dazzling object in space is known in advance, then there is no need for image-processing methods to select the image area. For example, the selection of the image area can be determined from the known position of the dazzling object in space, and the alignment of the optical system in space. The illuminated area may, if required, also be moved with the movement of the dazzling object in the field of view, such that the dazzling object is always completely shadowed.

Alternatively or additionally, it is advantageous for the position of the illuminated area to be regulated (i.e., closed-loop controlled) on the basis of a characteristic of the dazzling object and/or of dazzling by the dazzling object. For example, if the sun is being shadowed by a panel that moves with it, it is nevertheless possible for the shadowing not to be complete because the optical system has itself moved to a major extent, and for an edge of the sun to emerge now and again from the shadowing. If the dazzling which this results in is identified as such and its position in the field of view is identified, then the position of the illuminated area can be readjusted by the closed-loop control system, and the dazzling object can be completely, or essentially completely, shadowed again in a very short time.

In order to allow a shadowed dazzling object to be monitored precisely, it is advantageous for it still to be visible through the shadowing. For this purpose, the shadowing is not complete, such that a residual transparency remains. In order to prevent damage to the detector device, this residual transparency is advantageously controlled such that the panel is illuminated in a selected area such that it is opaque at the frequencies to which the detector device is sensitive, with the shadowing radiation then being reduced until a selected partial transmission level is reached. The transmission level can be selected by image evaluation by reducing the shadowing radiation and therefore increasing the transmission level until the dazzling object can be seen to a predetermined extent.

In order to quickly reduce the transparency of the panel in the selected area, it is advantageous for the panel to be kept at a temperature which is close to the critical temperature at which the panel changes its transparency, even before it is illuminated, at least in places. Suitable separations from the critical temperature are 1° C. to 20° C. For this purpose, the panel can be heated from its edge area by a heating means, which makes contact with the panel, before it is illuminated from the outside in places. The heating is expediently carried out to a predetermined panel temperature.

The closer the heating temperature is to the critical temperature of the panel, the greater the extent to which the heat introduced leads, as a result of shadowing radiation in the selected area, to the heat introduced also heating edge areas outside the selected area, with these therefore becoming less transparent. This allows a gradual increase in transparency to be achieved around the selected area. The size of the area outside the selected area, but which reduces its transparency by the energy introduced, is referred to in the following text as the edge shadow area, and can be set by the preheating temperature.

This is advantageous in order to make it possible to effectively mask out dazzling objects with different movement dynamics, without extensive image interference. If a dazzling object has low movement dynamics, that is to say it is moving slowly over the field of view, a small edge shadow area or no edge shadow area is sufficient, since the illuminated area can be slaved to the dazzling object in the field of view, corresponding to the slow movement. In the case of high dynamics, it may not be possible for the illuminated area to follow the movement of the dazzling object sufficiently quickly, with the dazzling object, to be precise its image, leaving the shadow area. If there is no edge shadow area, the full intensity of that part of the dazzling object which emerges from the shadow will strike the detector without being reduced. When an edge shadow area is used, although a portion of the dazzling object emerges from the core shadow of the panel, it remains, however, in the partial shadow of the edge shadow area, which gradually becomes more transparent outwards. Depending on the size of the edge shadow area, the emerging part is still greatly attenuated. The emerging part of the dazzling object can be identified, and the illuminated area can be correspondingly readjusted, such that the dazzling object is once again located in the core shadow, and is completely screened. The edge shadow area is advantageously set as a function of a characteristic of a dazzling object in the image.

Instead of or in addition to prior calculation of the position of a dazzling object and corresponding positioning of the panel, a second detector can be used to identify the position of a dazzling object, for example by image-processing methods, and the illuminated area can be positioned such that radiation from the dazzling object does not reach the first detector. For this purpose, the detector device expediently has a first and a second detector, and the beam path to the first detector is interrupted, in particular completely interrupted, such that no radiation from outside the apparatus any longer strikes this first detector, the image area is selected with the aid of the second detector, for example by using image-processing methods to evaluate the image from the second detector, and the dazzling object and its position in the image are identified, then the position of the area to be illuminated is defined, the panel is illuminated, and the beam path to the first detector is opened again. The position of the dazzling object can be tracked with the aid of the image obtained by the second detector, and the illuminated area can be appropriately positioned in front of the first detector, such that the dazzling object is always masked out of the image of the first detector.

The invention also relates to an apparatus for imaging a surrounding area on a detector device having an optical system for production of an imaging beam path, and having a panel, which is arranged in the imaging beam path, for shadowing a subarea of the image of the surrounding area on the detector device.

With the above and other objects in view there is also provided, in accordance with the invention, an apparatus for imaging a surrounding area on a detector of a detector device (the detector has a frequency range in which it is sensitive), the apparatus comprising:

an optical system for producing an imaging beam path;
a panel arranged in the imaging beam path;
an emitter for directionally illuminating the panel; and
a control device configured to control said emitter for illuminating said panel in a subarea thereof, wherein an illumination of said panel in said subarea causes a transmission therethrough to be reduced, in comparison with an unilluminated area, within an entire frequency range of sensitivity in which the detector is sensitive, so that a subarea of the image of the surrounding area is shadowed on the detector.

In other words, the objects relating to the apparatus are achieved in that the apparatus has a radiation means for directional illumination of the panel and a process means which is designed to control the radiation means such that the panel is illuminated in a subarea, wherein the transmission of the panel in the subarea is reduced by the illumination, in comparison to the unilluminated area, in the entire frequency range in which the detector device is sensitive. An image area to be shadowed can be shadowed quickly, thus making it possible to take precautions against image interference or damage to the detector device. The panel advantageously passes through the entire beam path, such that it completely shadows the detector device when illuminated completely.

The panel is advantageously arranged immediately adjacent to a detector of the detector device or to a window to the detector, for example a Dewar window. The distance between the panel and the detector, or between the detector window and the detector, is expediently no more than 2 mm, in which case the distance can be fixed or can be adjustable.

In the case of a two-stage or multi-stage optical system, with an intermediate image, the panel is expediently arranged on the intermediate-image plane. When arranged on the intermediate-image plane, vignetting of the image caused by the panel can be kept negligibly small and can still be kept small when arranged close to the detector, thus making it possible to largely avoid interfering optical effects of the panel in the image or making it possible to keep them at an acceptable level.

A further embodiment of the invention provides for the optical system to produce a beam path which is telecentric on the image side and in which the panel is arranged. In the telecentric beam path, the shadowing of the panel remains at least essentially of the same magnitude irrespective of its position in the field of view, thus making it possible to achieve shadowing of homogeneous size, even adjacent to the edges of the field of view, when the illuminated area is positioned there.

It is also advantageous for the detector device to have at least two detectors with mutually different absolute and/or spectral sensitivity. The two detectors are expediently directed at least essentially at the same section of the surrounding area. In this case, the first detector can be used to display the image of the surrounding area, and the second can be prepared to determine a characteristic of the dazzling object.

A further advantageous embodiment of the invention provides for the panel to be moved in the direction of the optical axis. This makes it possible to deliberately make use of and vary vignetting of the image caused by the panel. This invention detail can be used alternatively or additionally for adjusting the edge shadow area by heating.

Other features which are considered as characteristic for the invention are set forth in the appended claims.

Although the invention is illustrated and described herein as embodied in a method and apparatus for imaging a surrounding area on a detector device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The drawing and the description contain numerous features in combination, which a person skilled in the art will also expediently consider individually, and combine to make further worthwhile combinations.

DETAILED DESCRIPTION OF THE INVENTION

Figure 1:
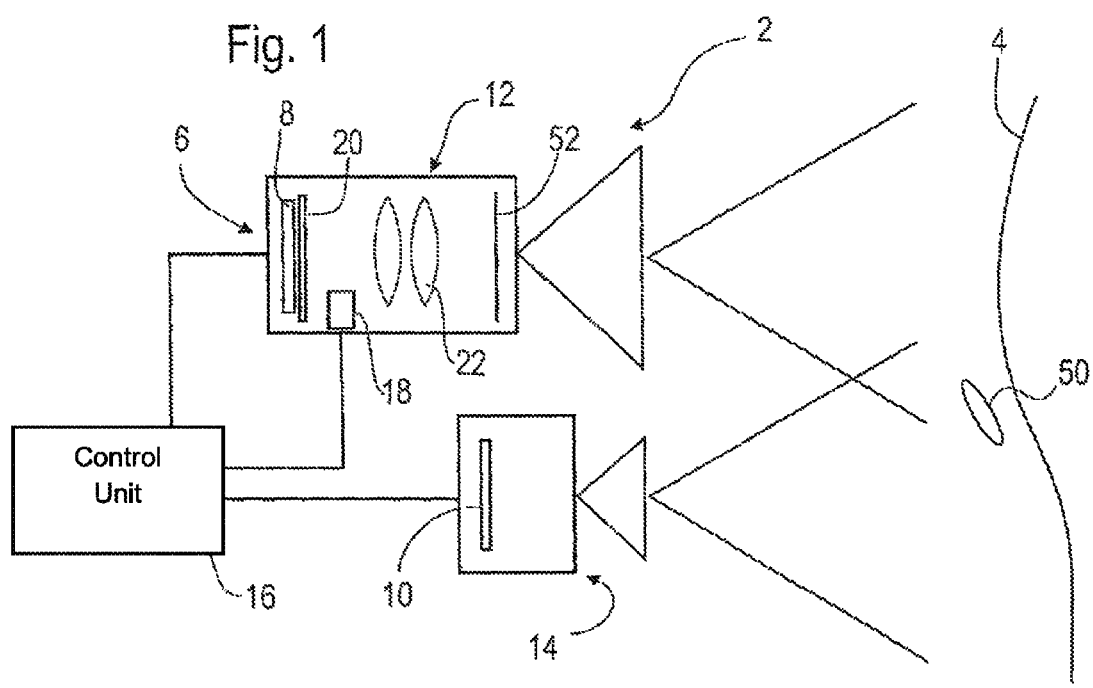
FIG. 1 shows a schematic illustration of an apparatus for imaging a surrounding area by means of a detector device which has two different detectors.

Referring now to the figures of the drawing in detail and first, particularly, to FIG. 1 thereof, there is shown an apparatus 2 for imaging a surrounding area 4 on a detector device 6, which has two detectors 8, 10. The detectors 8, 10 are components of two different cameras 12, 14, which both have a field of view of 60°×60° into the surrounding area 4, with both cameras 12, 14 recording the same section of the surrounding area 4. Both cameras 12, 14 are connected to a control means 16, which is in the form of an electronic data processing unit which has a computer program which is designed to control an emitter 18 for illumination of a panel 20 in front of the detector 8, and for selection of an image area which is intended to be covered by the panel 20.

The detector 8 is a microbolometer which is sensitive in the infrared spectral range (long-wave infrared between 8 µm and 12 µm) and is arranged in a vacuum vessel. The detector 10 is likewise a matrix detector, but is considerably less sensitive, although over a wider spectral range, than the detector 8. While the camera 12 is designed for imaging and monitoring the surrounding area 4, the camera 14 is designed to identify dazzling objects in the field of view of the camera 12, in which case the position of the dazzling object in the field of view of the camera 14, and therefore in the field of view of the camera 12, is determined with the aid of the control means 16.

Figure 2:
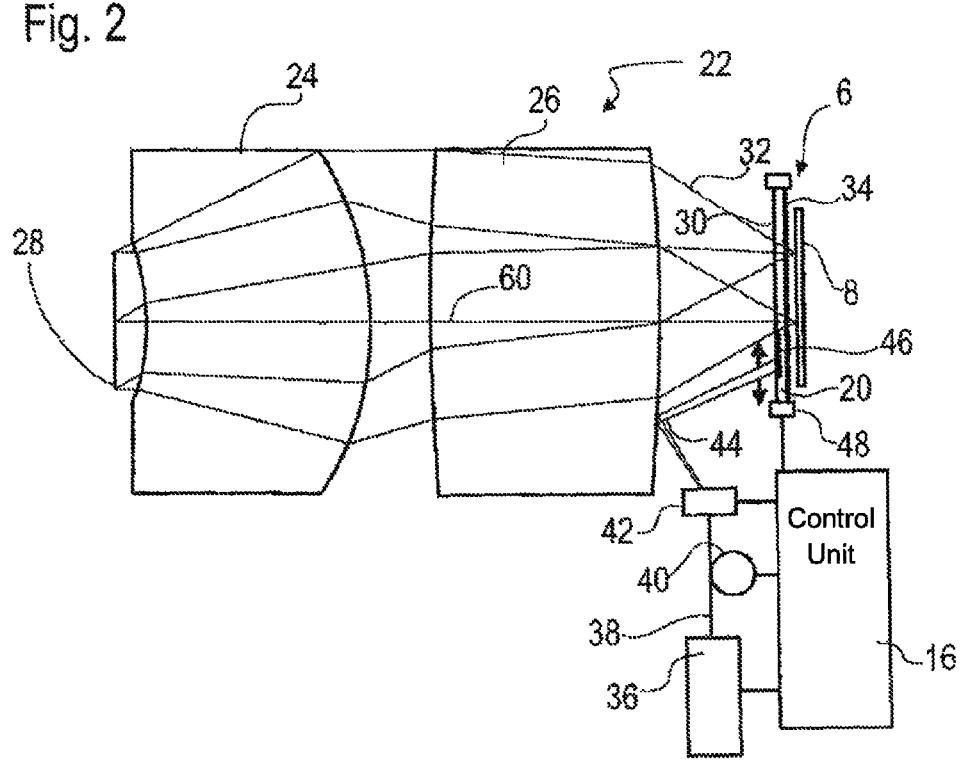
FIG. 2 is an illustration of an optical system on one of the detectors of the detector device shown in FIG. 1.

FIG. 2 shows an optical system 22 and that part of the detector device 6 which is arranged in the camera 12. The optical system 22 has an objective with single-stage optics with a field of view of 60°×60°, and a focal length of 18 mm. The F-number is 1. It comprises two lenses 24, 26 composed of germanium, and the aperture stop 28 is arranged immediately in front of the first lens 24. The objective has a beam path which is telecentric on the image side, that is to say the beam cones of the pixels on the detector 8 are parallel.

That part of the detector device 6 which is located in the camera 12 has, in addition to the detector 8, a vacuum vessel with a detector window in front of the detector 8, through which the beam path 32 of the objective passes, and strikes the detector 8. The distance between the panel 20 and the detector window is 0.5 mm.

The panel 20 is arranged in the beam path 32 such that it crosses through the entire beam path 32, and can therefore block all the radiation on the detector 8 that is incident through the aperture stop 28. It has a highly thermally conductive support layer which is coated on the side facing the optical system 22 with a thermochromic layer 30 composed of vanadium dioxide, and on the side facing the detector 8 with a reflection layer 34, which is indicated as a thick line in FIG. 2. The reflection layer 34 reflects that portion of a beam 44 which heats parts of the panel 20 and has passed through the panel 20 in such a way that it is once again passed into the panel 20.

The emitter 18 comprises a laser 36 whose radiation output is connected to an optical cable 38, for example comprising glass fibres. A so-called fibre pigtail 40 is used for optical pumping and therefore for amplification of the shadowing radiation passed through the optical cable 38. The optical cable 38 opens into a beam controller 42, in which the beam 44 is directed and shaped with the aid of microlenses, which move with respect to one another and are arranged in the form of a telescope. The beamforming comprises adjustment of the divergence of the beam 44, which is indicated in FIG. 2, such that the size of the area of the panel 20 which is illuminated by the non-moving beam 44 can be adjusted. The beam controller 42 aligns the beam 44 with an area 46 of the panel 20 to be illuminated, in which case the area 46 may be larger than the area which can be illuminated by the beam with maximum divergence. In this case, the beam 44 is passed periodically over the area 46, as is indicated by the two arrows, such that it scans the area and thus illuminates it uniformly.

The control means 16 is connected to the laser 36 for switching the beam 44 on and off, to the fibre pigtail 40 for adjusting the radiation power of the beam 44, to the beam controller 42 for shaping and guiding the beam 44, and to a heating means 48 for preheating the panel 20, which surrounds the panel 20 in the form of a frame.

When the laser beam 44 illuminates the panel 20, it is passed to the lens 26. The wavelength of the beam 44 is less than 1 μm, as a result of which the lens 26 is opaque for the radiation of the beam 44, and the lens 26 reflects the beam 44 to the panel 20. The beam 44 strikes the thermochromic layer 30 and heats it above the critical temperature for the phase change, as a result of which the thermochromic layer 30 becomes completely opaque in the illuminated area 46, in the range between 8 μm and 12 μm. Radiation in this wavelength range is reflected by the layer, and does not reach the detector 8. While illuminated by the laser 36, the portion of the laser radiation which has passed through the panel 20 is reflected by the reflection layer 34 such that it is once again passed into the panel 20, and heats it.

The apparatus 2 is used as a monitoring system for monitoring the surrounding area 4, and the panel 20 is used for protection against an excessively high illumination intensity of the detector 8 from solar incident radiation. In this example, there is no camera 14. The control means 16 calculates the position of the sun in the field of view, with the determination of the position of the sun in the field of view being equivalent to selection of this image area. The control means 16 now controls the position of the area 46 to be illuminated in the field of view such that the sun is completely masked out from the image of the surrounding area 4 on the detector 8.

In addition, the control means 16 or some other image processing unit can detect a potential dazzling object 50 which is initially not dazzling. A dazzling object 50 may be an aircraft or some other airborne vehicle, or a vehicle or the like. The identification as a potential dazzling object can be determined by a characteristic of the dazzling object 50, for example a shape or some other characteristic of the appearance, an emission characteristic, for example that of an engine, and/or movement dynamics. It is also possible to identify the potential dazzling object 50 by radar, which is connected for data transmission purposes to the control means 16. The position of the area 46 to be illuminated on the panel 20 in order to mask out the dazzling object 50 can be selected appropriately from the identified position of the potential dazzling object in space or in the field of view, and the process of the emitter 18 illuminating the panel 20 can be started, thus shadowing the image area around the dazzling object 50.

The illumination is initially carried out such that the selected area 46 of the panel 20 is completely opaque, and therefore such that no light can pass through in the sensitivity range of the detector 8. The incident radiation is then reduced until the temperature of the panel 20 in the area 46 has fallen to the critical temperature, as a result of which the thermochromic material becomes transparent again. The dazzling object 50 can once again initially be seen in the image, and can be identified and tracked by image processing. The power input from the outside into the area 46 is now regulated (i.e., closed-loop controlled) on the basis of a characteristic of the dazzling object 50 in the image. Open-loop or closed-loop control on the basis of a characteristic of the dazzling object 50 is generally advantageous. The power is expediently set such that the dazzling object 50 can still be identified, but its radiation does not interfere with the image. Other characteristics, such as radiation continuity of the dazzling object 50, can also be used for open-loop or closed-loop control of the input power. In general terms, the input power is subjected to open-loop or closed-loop control from results of image evaluation of the image of the detector device 6.

Furthermore, there is an image processing program within the control means 16, which evaluates an illumination intensity of each pixel of the matrix detector 8 and/or of the matrix detector 10 of the camera 14. If the intensity in at least one pixel exceeds a limit value, then a masking-out process is started with the aid of a program or a program part which is carried out by the control means 16. If the radiation intensity in the masked pixel is, for example, above the first limit value but below a second limit value, as a result of which the radiation is not classified as presenting any risk of damage to the detector 8, although it will interfere with the image, the position of the masked pixel can be determined with the aid of the detector 8, and the shadowing can be removed. If the dazzling object 50 emerges from the shadowed area in the image, then pixels at the edge of the shadowing are masked, such that their intensity rises above the limit value. This is registered by the control means 16, and the position of the shadow is controlled in accordance with the measured radiation intensities such that the shadowing is moved over the masked pixels. The controlled variable is a radiation intensity measured on the detector 8 or detector 10.

If a measured intensity exceeds a second limit value, then a shutter 52 in the first camera 12 is closed, as a result of which the beam path 32 is completely interrupted, and radiation can no longer strike the aperture stop 28. It is therefore no longer possible to use the camera 12 to monitor the surrounding area. Instead of this, coarser monitoring of the surrounding area 4 can be carried out with the aid of the camera 14, whose purpose is now to find the position of the dazzling object in the field of view, or in the image. This is carried out by an intensity measurement of the radiation on the pixels of the detector 10 or their signal strength, with the aid of the control means 16. As soon as the position of the dazzling object 50 has been determined in the field of view or in the image, the relevant image area and a predetermined area surrounding it are shadowed. The shutter 52 is then opened again, and the surrounding-area monitoring is continued, with the dazzling object 50 being masked out by the shadowing in the image. The position of the shadowing in the image is continuously readjusted with the aid of the radiation intensities measured at the detector 10, from which the position of the dazzling object 50 is continuously monitored in the image. It is, of course, also possible to use the detector 8 to track the position of a dazzling object 50 whose radiation intensity is only between the two limit values. It is likewise possible to dispense with the camera 14 and to carry out the intensity evaluation and/or position measurement of the dazzling object only with the aid of the detector 8.

The size and shape of the illuminated area 46, and therefore of the shadowing on the detector 8, may be chosen as required, and may even cover the entire image. The greater the shadowing is, the more power is introduced into the panel 20. This power may come from the beam 44 alone. In the case of large areas 46, it is worthwhile introducing a portion of the power by the heating means 48, by means of which the panel 20 is preheated. The temperature of the panel 20 is detected by a sensor which is connected to the control means 16 and scans the entire area of the panel 20. The larger the area to be illuminated, the greater the initial heating power may be or the closer the temperature of the panel 20 may be brought to the critical temperature of the thermochromic layer before or during the illumination, as a result of which the radiation has to introduce less power per unit area.

A size of the area 46 to be illuminated, and therefore of shadowing in the image, can be matched to the size of an identified dazzling object 50. In this case, it is possible for the size to be chosen such that there is always a remaining fixed distance between the edge of the dazzling object 50 and the edge of the shadowing. This distance can be influenced by a number of factors. One factor may be a radiation intensity of the dazzling object 50 per unit area on the detector 8. Movement dynamics of the dazzling object 50 in the image can also be used as an open-loop or closed-loop controlled variable for adjusting the size of the shadowing. If the dazzling object 50 has low movement dynamics, that is to say it is moving at slow speed in the image, it is sufficient to leave the shadowing small, since the risk of the dazzling object 50 emerging unnoticed from the shadowing in the image is low. In the case of high movement dynamics, it is worthwhile setting the shadowing to be large, such that the dazzling object 50 remains shadowed even in the event of rapid and unexpected movements. In general terms, the size of the area 46 and therefore of the shadowing is set in the image as a function of a characteristic, in particular of the movement dynamics of the dazzling object 50.

Figure 3:
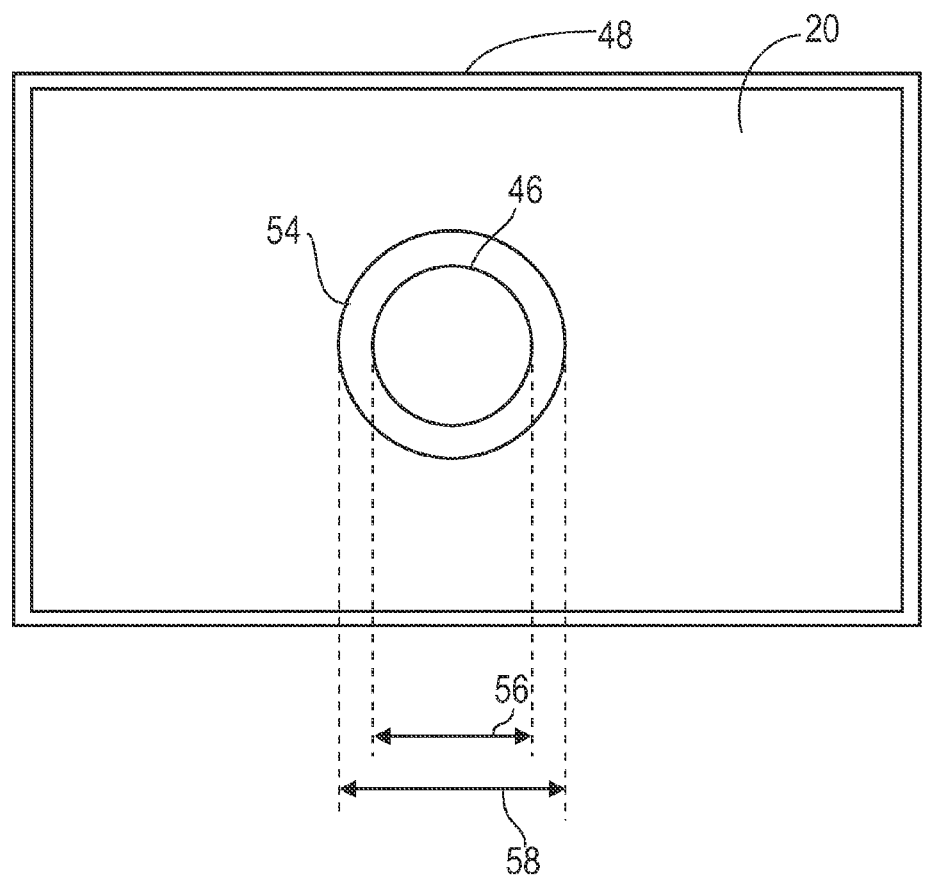
FIG. 3 shows an illuminated area of a panel in front of the detector from FIG. 2, which is surrounded by an edge shadow area.

FIG. 3 shows an edge shadow area 54 which can be used around the illuminated area 46. The size of the edge shadow area 54 can be adjusted with the preheating temperature of the panel 20, and alternatively or additionally with the heating power of the beam 44 per unit area. The higher the preheating temperature of the panel 20 and/or the heating power of the beam 44 per unit area is, the larger is the edge shadow area 54 with respect to the width of the edge shadow area 54 which results in FIG. 3 from the illuminated area 46, which forms a core shadow with a first diameter 56, and the edge shadow area 54, which forms a partial shadow with a larger diameter 58. Half of the difference between the two diameters 56 and 58 and therefore the width or size of the edge shadow area 54 can thus be selected.

A similar effect can be achieved by vignetting of the image by shadowing, if this is not located on an image plane of the optical system 22. The further the panel 20 is away from the image plane, the greater is the vignetting. The vignetting can be set by moving the panel 20 in the direction of the optical axis 60 in the beam path 32. The further the panel 20 is away from the image plane, the greater is the vignetting and the ratio of the large diameter 58 to the small diameter 56, even without an edge shadow area 54. The movement of the panel 20 parallel to the optical axis 60 is likewise controlled by the control means 16, although closed-loop control is also feasible.

The vignetting and/or the edge shadow area 54 are/is set by the control means 16 as a function of a characteristic of the dazzling object 50. The characteristic may be movement dynamics of the dazzling object 50, a speed of the dazzling object 50 in the image, a size and/or a radiation intensity of the dazzling object 50.

The invention claimed is:

1. A method for imaging a surrounding area on a detector of a detector device, the method which comprises:
providing an optical system with an imaging beam path;
placing a panel in the imaging beam path;
illuminating a subarea of the panel to reduce a transmission of the panel in the subarea due to the illumination in an entire frequency range in which the detector of the detector device is sensitive, and shadowing a selected subarea of an image with the illuminated subarea of the panel.

2. The method according to claim 1, wherein the panel contains thermo-chromic material.

3. The method according to claim 1, which comprises illuminating the subarea of the panel with a directional beam, and defining a shape of the illuminated subarea by changing an alignment of the beam on the panel.

4. The method according to claim 1, which comprises illuminating the subarea of the panel with a directional beam and reflecting the directional beam off an element of the optical system prior to striking the panel.

5. The method according to claim 1, which comprises heating the panel with a heating means, which makes contact with the panel, from an edge area prior to the panel being illuminated in places from outside.

6. The method according to claim 1, which comprise, prior to the illumination, setting an edge shadow area, beyond the illuminated subarea of the panel, by preheating the panel as a function of a characteristic of a dazzling object in the image.

7. The method according to claim 1, which comprises identifying a dazzling object in an image of the surrounding area, and regulating the illumination of the panel as a function of a characteristic of the dazzling object.

8. The method according to claim 1, wherein the detector device has a first detector and a second detector, and the method further comprises the following sequential steps:

completely interrupting the beam path to the first detector;
selecting an image area to be shadowed with the second detector;
illuminating the panel in the subarea; and
opening the beam path to the first detector once again.

9. An apparatus for imaging a surrounding area on a detector of a detector device, the detector having a given frequency range of sensitivity, the apparatus comprising:
an optical system for producing an imaging beam path;
a panel arranged in the imaging beam path;
an emitter for directionally illuminating the panel; and
a control device configured to control said emitter for illuminating said panel in a subarea thereof, wherein an illumination of said panel in said subarea causes a transmission therethrough to be reduced, in comparison with an unilluminated area, within an entire frequency range of sensitivity in which the detector is sensitive, so that a subarea of an image of the surrounding area is shadowed on the detector.

10. The apparatus according to claim 9, wherein said panel is movably mounted parallel to an optical axis of said optical system.

* * * * *